United States Patent [19]

Brunnett et al.

[11] Patent Number: 4,831,470
[45] Date of Patent: May 16, 1989

[54] METHOD AND APPARATUS FOR RECORDING DISK SERVO INFORMATION WITH DETACHABLE POSITION DECODER

[75] Inventors: Donald Brunnett, Mission Hills; Ashok K. Desai, Westlake Village, both of Calif.

[73] Assignee: Brand Technologies, Woodland Hills, Calif.

[21] Appl. No.: 108,287

[22] Filed: Oct. 13, 1987

[51] Int. Cl.$^4$ .......................... G11B 5/58; G11B 33/06
[52] U.S. Cl. .................................... 360/75; 360/77.03; 360/78.11; 360/97.01
[58] Field of Search .................... 360/75, 77.02, 77.03, 360/77.05, 78.04, 78.11, 97.01; 369/43

[56] References Cited

U.S. PATENT DOCUMENTS

| | | | |
|---|---|---|---|
| 3,875,589 | 4/1975 | Applequist et al. | 360/78.12 |
| 4,068,268 | 1/1978 | Idemoto et al. | 360/75 |
| 4,371,902 | 2/1983 | Baxter et al. | 360/77.03 |
| 4,531,167 | 7/1985 | Berger | 360/77.02 |

*Primary Examiner*—Alan Faber
*Assistant Examiner*—David L. Robertson
*Attorney, Agent, or Firm*—Freilich, Hornbaker, Rosen & Fernandez

[57] ABSTRACT

A method and apparatus for originally recording servo information on a disk surface. The apparatus comprises a servo writer assembly which includes an optical encoder having a movable input member and means for producing an output signal which indicates small uniform units of movement of said input member. The servo writer assembly is detachably mounted to a disk storage system with the optical encoder input member tightly physically coupled to the head arm of the storage system head disk assembly. During servo writing, the optical encoder output signal is connected in a closed servo loop with the head positioner motor so that the positioner motor can then be operated to precisely radially increment the servo head, track by track, over the disk servo surface.

11 Claims, 5 Drawing Sheets

METHOD AND APPARATUS FOR RECORDING DISK SERVO INFORMATION WITH DETACHABLE POSITION DECODER

BACKGROUND OF THE INVENTION

This invention relates generally to disk drive systems for storing digital data and more particularly to such systems utilizing servo information recorded on a disk surface for controlling the positioning of read and/or write heads with respect to a plurality of concentric tracks recorded on other disk surfaces.

Typical high capacity disk storage systems use a plurality of rigid magnetic disks stacked on a common spindle. For example only, such a system may consist of five disks defining ten major disk surfaces with one surface being dedicated to storing servo information and nine surfaces (typically, only eight are used) for storing digital data. Such a disk system typically includes a positioner subsystem, mounted adjacent to the disk stack, carrying a plurality of aligned read/write heads including at least one head per active disk surface (i.e. servo plus data surfaces). The heads are typically mounted on a common head arm which is coupled to a positioner motor. Energization of the positioner motor moves the arm to thus move each head radially relative to its disk surface. By properly controlling the positioner motor, the heads can seek, and then follow, any selected one of a plurality of concentric tracks.

A disk storage system is typically comprised of two primary portions; namely, a head disk assembly (HDA) and a controller electronics board. In the normal operation of such a system, a track seek command is issued by a host computer to the controller electronics via an appropriate interface board. The controller electronics determines the direction and magnitude of movement required to move the heads from their current track (or "cylinder") position to the new or destination track. Based on this information, the controller electronics selects an optimized velocity profile to rapidly move the head arm to position the heads over the destination track.

High performance disk storage systems attempt to maximize the density at which tracks are written on the disk surface. For example, it is not unusual for such systems to record tracks at a density in excess of one thousand per radial inch. In order to achieve such high track densities and permit rapid head positioning, the positioner motor is usually operated in a closed servo loop. That is, as the positioner motor is energized to move the heads, the head associated with the dedicated servo surface counts track crossings of a prerecorded servo pattern until the head arrives at its destination track. More specifically, assume for example that the heads are currently at track 19 and that the computer issues a command to move the heads to track 739. In response, a track counter is set to the magnitude of movement required, i.e. 720, and the positioner motor is moved in accordance with a velocity profile which permits it to accelerate to a maximum velocity, maintain that maximum velocity for a certain interval, and then decelerate to reach zero velocity concurrent with the head arriving at the destination track. The velocity transition points are generally determined by the current count in the track counter which is decremented as the servo head detects each track crossing of the servo pattern recorded on the dedicated servo surface.

The foregoing explanation generally describes various state of the art systems well known in the literature and widely commercially available. Such systems differ in many specific aspects including the electromechanical design of the HDA, the particular servo pattern employed on the disk surface, the electronic design of the controller electronics, etc. In all such systems, however, it is necessary that the servo information be originally recorded, generally during a phase of factory check out, before the system can be operational inasmuch as the servo information is relied on for normal track seeking (counting), track following, and head velocity determination.

The present invention is primarily directed to a method and apparatus for originally recording servo information on a disk surface. Prior techniques for recording servo information at high track densities have generally utilized laser based servo writer assemblies in which the physical position of the servo head is measured at each track by a laser measuring system (e.g. Hewlett-Packard Model 5528A). Such servo writer assemblies are expensive and bulky.

SUMMARY OF THE INVENTION

The present invention is directed to an improved method and apparatus for recording servo information on a disk surface. The particular servo information or pattern utilized is not germane to the invention in that embodiments of the invention are equally applicable to a variety of servo patterns well known in the art.

More specifically, the invention is directed to a method and apparatus for inexpensively and rapidly recording original tracks of servo information on a disk surface. Apparatus in accordance with the invention comprises a servo writer assembly which includes an optical encoder having a movable input member and means for producing an output signal which indicates small uniform units of movement of said input member.

In accordance with the invention, the servo writer assembly can be readily detachably mounted to a disk storage system with the optical encoder input member tightly physically coupled to the head arm of the storage system HDA. During servo writing, the optical encoder output signal is connected in a closed servo loop with the HDA positioner motor so that the positioner motor can then be operated to precisely radially increment the servo head, track by track, over the disk servo surface.

Although prior art disk storage systems are known in which an optical encoder comprises a permanent part of the system's operational head positioning subsystem, it is believed that the use of a detachable optical encoder to originally write the servo information which is then used for the system's operational head positioning, represents a significant advance in servo information recording.

In accordance with a preferred embodiment of the invention, the disk drive system includes a rotary positioner motor having a shaft stub extending therefrom. The servo writer assembly includes a rotary coupler which engages the shaft stub when the assembly is attached to the disk system. The rotary coupler is in turn secured to a rotatable shaft in the servo writer assembly which is tightly coupled to the optical encoder movable input member.

In accordance with a significant feature of the preferred embodiment, the optical encoder input member comprises a long arm mounted for limited rotation around the servo writer assembly shaft. This enables the optical encoder to be spaced by a large radial distance from the axis of the positioner motor shaft. As a consequence, high positioning accuracy can be achieved since relatively small angular motion of the positioner motor shaft enables the optical encoder to produce many output signal counts, each corresponding to a servo track to be recorded. For example, a sixteen degree rotation of the positioner motor shaft can readily produce over one thousand counts from the optical encoder output signal.

In accordance with a further aspect of the preferred embodiment, the optical encoder output signal comprises one or more alternating signals, e.g. triangular, in which each zero crossing represents a specific unit of angular movement of the servo writer assembly shaft. The servo writer assembly includes controller electronics responsive to the optical encoder output signal which functions to drive the positioner motor to incrementally step the servo assembly shaft through each unit of angular movement. The servo head is thus stepped radially along the servo surface and a servo information track is recorded at each radial step.

In accordance with a still further aspect of the preferred servo writer assembly embodiment, the rotary coupler for coupling the positioner motor shaft to the servo writer assembly shaft includes a flexible member to accommodate slight shaft misalignment.

In accordance with a still further aspect of the preferred embodiment, simple readily detachable means are provided for aligning and attaching the servo writer assembly to a head disk assembly for recording servo information therein.

DETAILED DESCRIPTION

Figure 1:
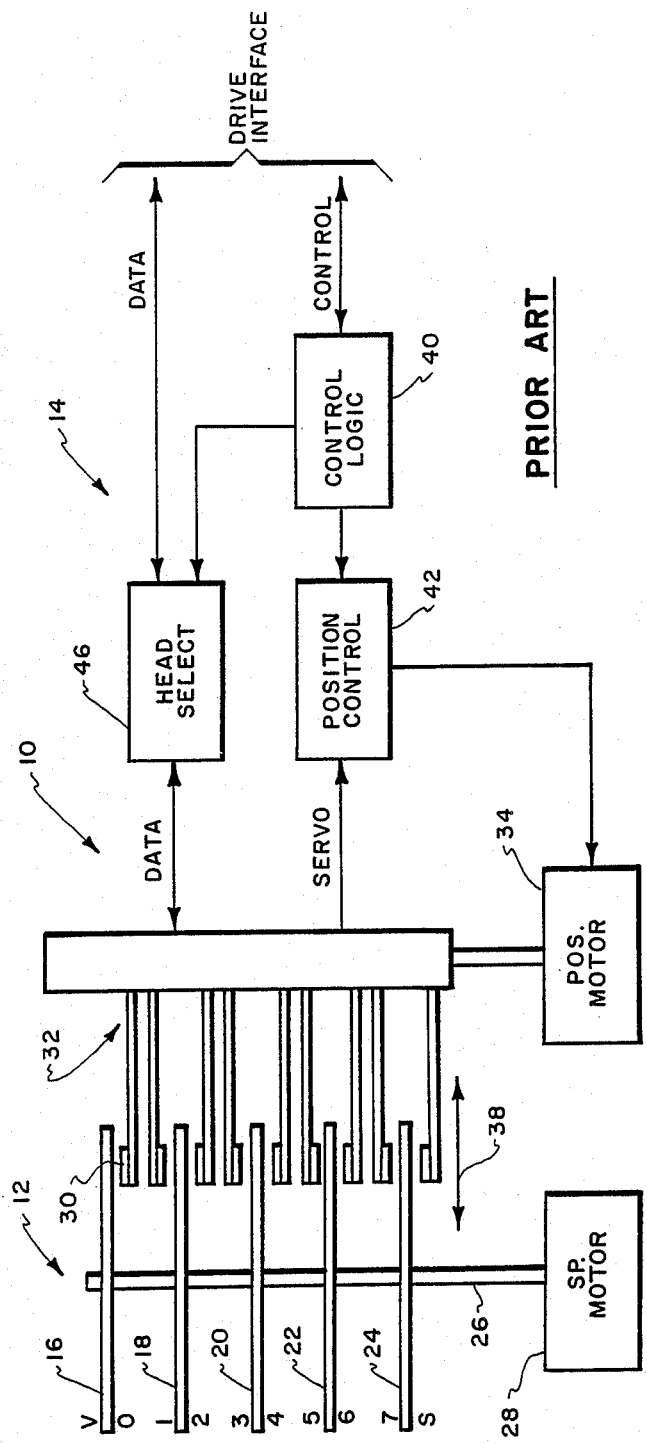
FIG. 1 is a block schematic diagram of a typical prior art rigid disk storage system.

Attention is initially directed to FIG. 1 which depicts a generalized block diagram of a typical prior art Winchester magnetic disk storage system 10. The storage system 10 is generally considered as being comprised of essentially two portions; namely, a head disk assembly (HDA) 12 and a circuit board of controller electronics 14.

Briefly, the HDA 12 is comprised of a plurality of rigid disks 16, 18, 20, 22, 24, which are mounted on a common spindle 26 coupled to the shaft of a spindle motor 28. Each of the disks defines two major surfaces having magnetic properties for magnetically storing digital information thereon. The operative major disk surfaces in FIG. 1 are labeled S and 0, 1, 2, 3, 4, 5, 6, and 7 respectively. The surface S represents a surface dedicated to the storage of servo information used for head positioning purposes as will be discussed hereinafter. The disk surfaces 0-7 are used for storing digital data. The surface V is typically vacant and unused in normal operation. Although FIG. 1 depicts a single dedicated servo information surface S, in fact the servo information could be distributed on one or more disk surfaces.

Associated with each disk surface is a read/write head 30. The heads 30 are typically mounted on a common head arm structure 32 which is coupled to the shaft of a positioner motor 34. The positioner motor 34 can be of several different types, e.g. a voice coil motor or a multiple phase DC motor. In any event, the purpose of the positioner motor 34 is to selectively move the head arm structure 32 to move the heads 30 radially over the disk surfaces. Information is typically recorded on the disk surfaces along concentric tracks radially spaced from one another. Thus, by moving the heads 30 radially relative to the disk surfaces, as represented by arrow 38, the heads can be moved into a position to read and/or write along any selected one of the radially spaced concentric tracks. Inasmuch as all of the heads 30 move together in a typical disk storage system, their position at any point in time is generally referred to by the track or cylinder number over which the heads lie. Thus, for example, the heads could currently be positioned over track 19 (assuming the outermost track to be track 0) and a positioning command can be then issued (by a host computer, not shown) to move the heads to track 739. This would require that the heads then move radially inwardly a distance corresponding to 720 tracks.

The controller electronics 14 depicted in FIG. 1 is intended to interface the head drive assembly 12 to a host computer (not shown). The positioning command issued by the host computer is supplied to control logic 40 which, typically, sets a track counter (not shown) in the position control electronics 42 to a count equal to the desired head movement. Thus, in the aforementioned example, the track counter would be set to 720 and the position motor 34 would be energized to move the heads in the appropriate direction. Depending upon the count set into the track counter, a certain velocity profile is selected which permits the heads to accelerate to a maximum velocity, maintain that maximum velocity for a certain interval, and then decelerate to reach zero velocity concurrent with the heads arriving at the destination track. The velocity transition points are generally determined by the current count in the track counter which is decremented as the head 30 associated with the servo surface S detects track crossings. More specifically, servo information is prerecorded on the servo surface S which precisely defines the position of each concentric track.

Various servo information patterns are known in the prior art, generally characterized by information alternately recorded inboard and outboard of a track centerline. As the heads are moved radially relative to the disk surfaces, the signal read by the head associated with the servo surface will define transitions indicating track crossings. These transitions are typically used to decrement the track counter during a track seeking operation. The information alternately recorded inboard and outboard of a track centerline is then used for track following to maintain the head position over the desired track centerline. With the heads positioned over the desired track, the control logic 40 can select a particular head, via head select logic 46, to read and/or write data which is transferred to or from the host computer.

The foregoing simplified explanation of the prior art disk storage system of FIG. 1 is intended to acquaint the reader with the operation of such a system and the use of prerecorded servo information for facilitating a positioning of the heads.

The present invention is not directed toward any particular disk storage system but rather is directed to an improved method and apparatus for originally recording servo information onto the surface of such a disk storage system. More specifically, the invention is directed to a servo writer assembly, including an optical encoder, which can be detachably attached to a head disk assembly (HDA) for writing the servo information, in closed loop fashion, onto a disk surface.

Figure 2:
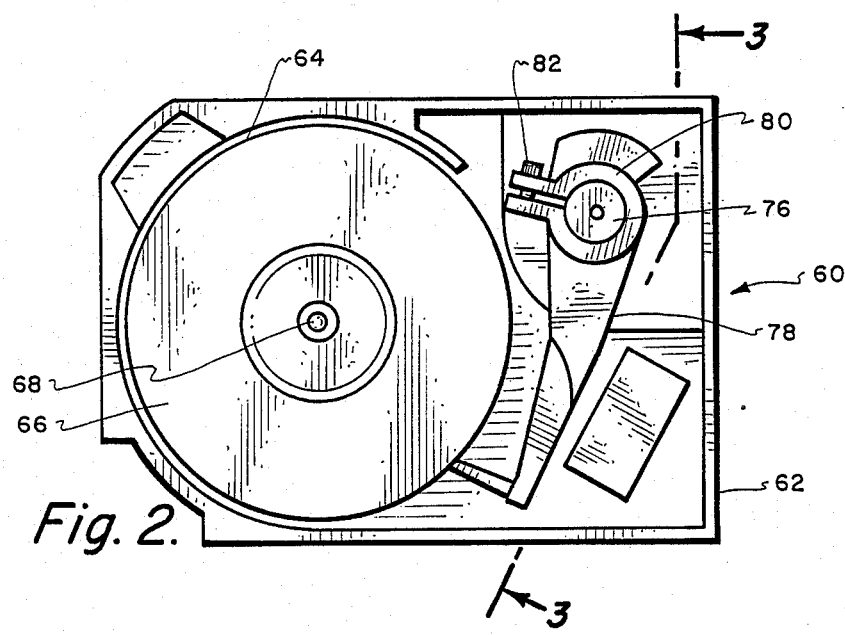
FIG. 2 is a top plan view of a head disk assembly characteristic of the assemblies with which the servo writer embodiment of the invention can be employed.
Figure 3:
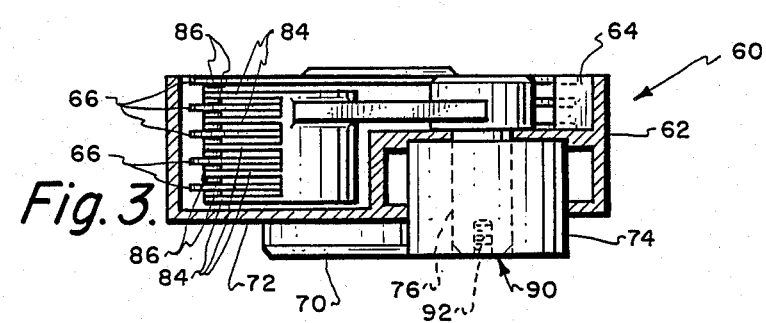
FIG. 3 is a sectional view taken substantially along the plane 3.3 of FIG. 2.
Figure 4:
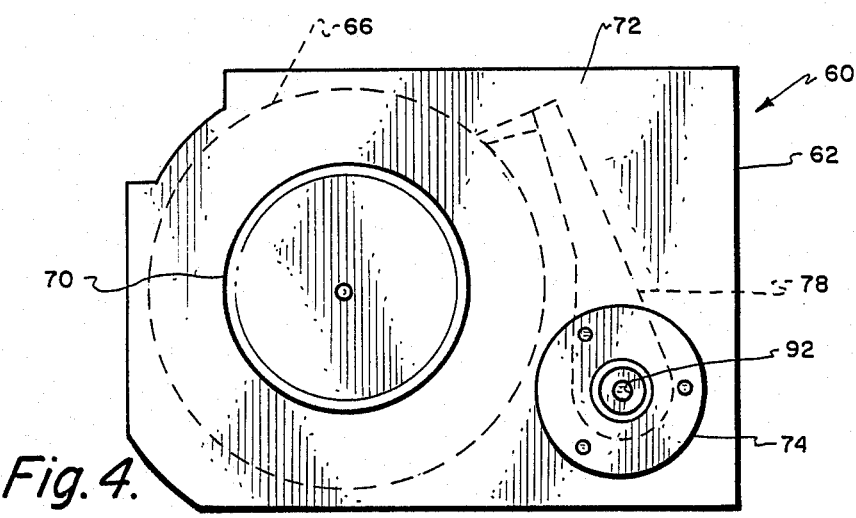
FIG. 4 is a bottom plan view of the HDA of FIG. 2.

Attention is now directed to FIGS. 2, 3, and 4 which depict a head disk assembly (HDA) whose structure is characteristic of assemblies with which the servo writer embodiments of the present invention can be readily employed. The HDA 60 is comprised of a housing 62, generally in the form of an aluminum casting, which defines a cavity 64. A plurality of disks 66 are stacked on a common spindle 68 within the cavity 64. The spindle 68 is coupled to a spindle drive motor 70 which is structurally mounted to the floor 72 of the housing 62, extending through an opening in the floor out of the cavity 64.

A positioner motor 74 is also mounted to the housing 62 extending below the floor 72 as is best depicted in FIG. 3. The positioner motor 74 is a rotary motor having a central shaft 76 which projects upwardly (as depicted in FIG. 3) into the housing cavity 64. A head arm 78 is secured to the positioner motor shaft 76 by a clamp ring 80 secured by bolt 82. The head arm 78 includes a plurality of fingers 84 which extend between the surfaces of the disks 66 for supporting a different head 86 adjacent each of the disk recording surfaces. As can be seen in FIG. 3, the shaft 76 of positioner motor 74 extends through the motor housing and is accessible outside of the housing 62 as at 90. A tapped hole 92 is provided in the shaft 76 externally of the housing 62.

Figure 5:
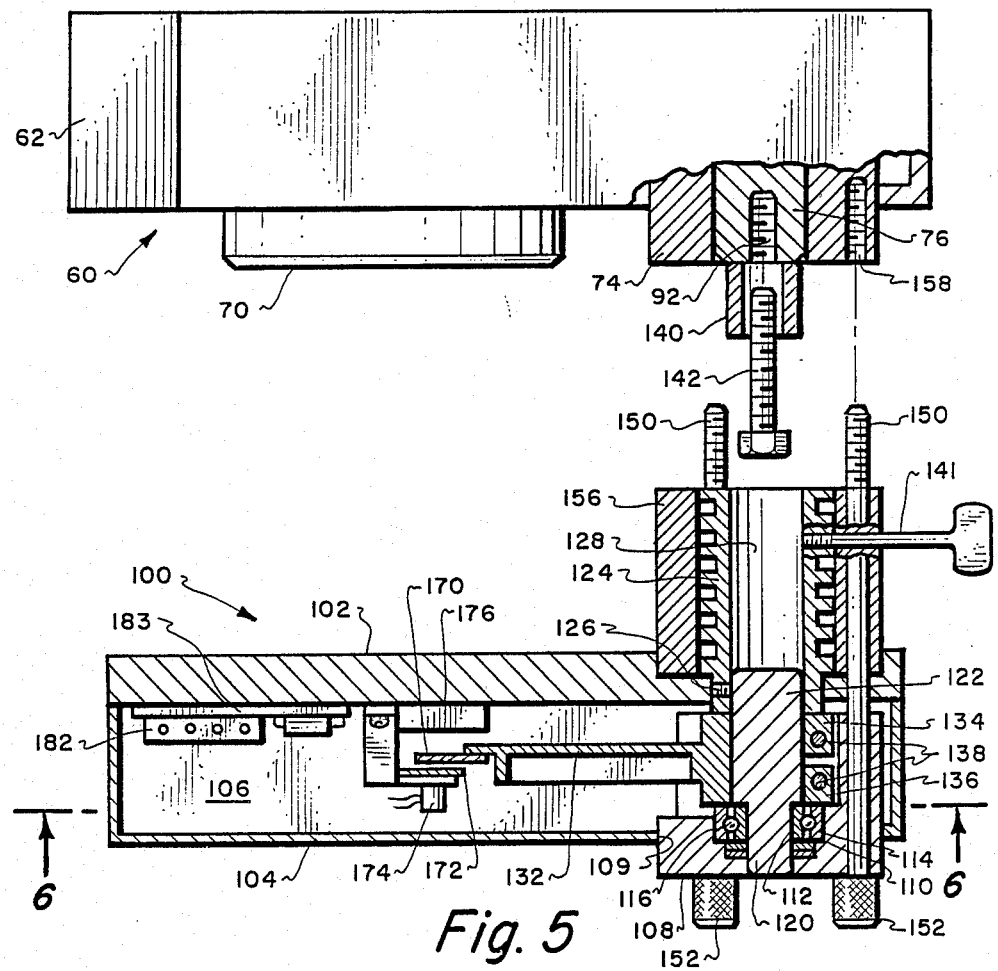
FIG. 5 is a side view depicting how a servo writer assembly in accordance with the present invention can be attached to a head disk assembly (HDA) for the purpose of originally recording servo information on a dedicated surface of the HDA.
Figure 6:
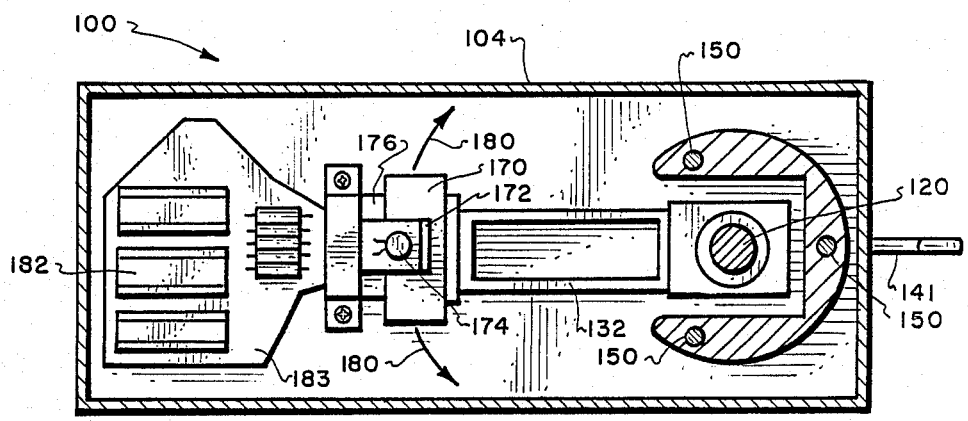
FIG. 6 is a sectional view taken substantially along the plane 6—6 of FIG. 5.

Attention is now directed to FIGS. 5 and 6 which depict a preferred servo writer assembly embodiment 100 in accordance with the present invention. FIG. 5 also depicts how the servo writer assembly 100 can be detachably physically coupled to the HDA 60 during a final phase of factory checkout for the purpose of originally recording servo information on a disk surface thereof, as will be described hereinafter.

The servo writer assembly 100 is comprised of a housing including a base plate 102 and lid 104 which together define an interior compartment 106. An open, essentially cylindrical, support member 108 is mounted in the compartment 106 extending through an opening 109 in the lid 104. The cylindrical support member 108 internally supports a bearing subassembly 110 comprised of an inner race 112 and an outer race 114. Ball bearings 116 are provided between the inner and outer races 112 and 114. The inner race 112 receives and is locked to the reduced end 120 of an idler shaft 122. A bellows-like flexible coupler 124 is fixed to the idler shaft 122 by a set screw 126. The flexible coupler 124 defines an open inner bore 128.

A movable member 132 in the form of a radially extending arm is secured to the idler shaft 122 by clamp rings 134, 136 clamped by bolts 138. The clamp rings 134, 136 secure the arm 132 to the idler shaft 122 for rotation therewith.

In the use of the servo writer assembly 100, the flexible coupler 124 is physically coupled to the shaft 76 of the positioner motor 74 so that the idler shaft 122 rotates therewith. More specifically, in accordance with one suitable technique for coupling the idler shaft 122 to the positioner motor shaft 76, a nipple 140 is provided which is secured to the positioner motor shaft 76 by a bolt 142 threaded into the tapped hole 92. The nipple 140 and open bore 128 of the flexible coupler 124 are closely dimensioned so that the nipple can be received in the bore 128 and be locked to the coupler 124 by a set screw 141 for rotation therewith.

More specifically, by bringing the servo writer assembly 100 upwardly, as depicted in FIG. 5, so that the coupler 124 receives the nipple 140, and then by fastening the servo writer assembly 100 to the HDA 60 by the use of elongated alignment bolts 150 having heads 152, the nipple 140 will be locked to the coupler 124 by set screw 141 and thus to the idler shaft 122. The alignment bolts 150 are depicted as passing through openings in the cylindrical support member 108 and the outer support frame 166 of the flexible coupler. They are then threaded into tapped holes 158 in the housing of the positioner motor 74. A variety of other fastening means could of course be utilized to physically couple the positioner motor shaft 76 to the idler shaft 122. One advantage of using a flexible coupler 124 is, of course, to be able to accommodate a slight misalignment, within manufacturing tolerance, between the positioner motor shaft 76 and the idler shaft 122.

With the servo writer assembly 100 fastened to the HDA 60, the aforementioned movable member or arm 132 will be locked for rotation to the positioner motor shaft 76. The arm 132 comprises a movable member of an optical encoder which produces an output signal indicative of angular movement of the arm 132. Optical encoders for producing a signal representative of angular movement are well known in the art and accordingly will only be discussed in general terms herein The optical encoder arm 132 carries at its end a movable scale 170 which swings across a fixed grating 172. A light source 174 is mounted beneath the fixed grating 172 and a photodetector 176 is mounted above the movable scale 170, all as depicted in FIG. 5.

In accordance with known optical encoder technology, the movable scale 170 and fixed grating 172 respectively comprise strips of material having a series of alternating transparent and opaque lines formed thereon. When the opaque lines of the movable scale 170 align with the transparent lines of the fixed grating 172, light transmission from the light source 174 to the photodetector 176 is blocked. However, as the movable scale 170 swings (arrows 180) relative to the fixed grating 172, the movable scale transparent lines will move into alignment with the grating transparent lines. Thus, the light seen by the photodetector 176 will increase from zero to a maximum. The output of the photodetector 176 is connected to microprocessor based processing circuitry 182 on circuit board 183 which includes optical encoder electronics for producing an output signal containing transitions which represent small unit increments of angular movement of the movable scale 172.

In an exemplary servo writer assembly in accordance with the present invention, the lines on the movable scale 170 and fixed grating 172 are spaced sufficiently closely so that over 1000 uniform increments of angular movement can be detected and indicated within a 16° swing of arm 132 around the axis of idler shaft 122. Or in other words, a 16° rotation of positioner motor shaft 76 produces an output signal from the optical encoder electronics which identifies in excess of 1000 increments of angular movement which, as will be seen hereinafter, are used to position the HDA heads to record successive concentric radially spaced tracks on a surface of the HDA disks.

The details of the optical encoder, essentially comprised of the aforementioned arm 132, movable scale 170, fixed grating 172, light source 174, photodetector 176, and optical encoder electronics in processing circuitry 182 are not disclosed in detail herein because similar optical encoder technology is well known in the art. Typically, the optical encoder electronics will produce a single output signal, or two output signals in quadrature (FIG. 7), having a triangular wave form. Each zero crossing of the triangular wave output signal represents a unit of angular movement of the positioner motor shaft, defined by the distance between adjacent opaque lines on the fixed grating 172. Because the movable scale and fixed grating are preferably located a greater radial distance from the axis of rotation than the heads, the tracks can be written more closely on the disk surface than the line to line spacing on the grating.

Figure 7:
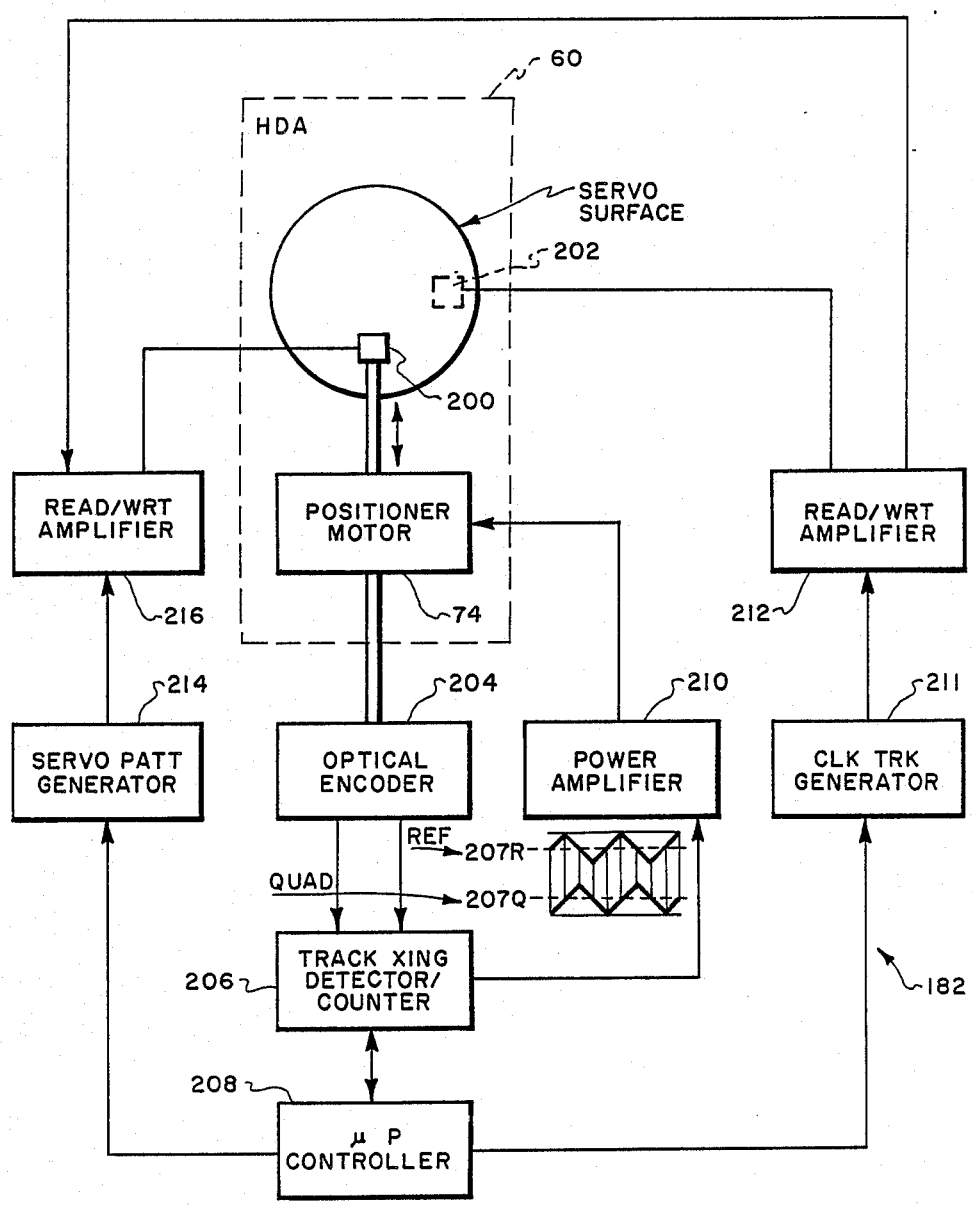
FIG. 7 is a block schematic diagram depicting the servo writer assembly control electronics in accordance with the present invention connected to a head disk assembly for originally recording servo information thereon.

Whereas FIG. 5 depicts the physical interconnection between the servo writer assembly 100 and HDA 60 when the assembly 100 is being used to originally record servo information, FIG. 7 comprises a block schematic diagram depicting the interconnection between the servo writer processing circuitry 182 and the HDA positioner motor 74 to cause the recording of the servo information.

FIG. 7 depicts the HDA 60, the dedicated disk servo surface therein, the read write head 200 associated with the servo surface, and the positioner motor 74 for moving the read write head radially across the servo surface. A second read write head 202 is also shown in FIG. 7 which is fixed in position for recording and reading a clock track. It is important to recognize here that the clock head 202 is positioned so as to write a clock track which does not interfere with the servo information written by head 200. Thus, the head 202 can be fixed at a radial position to write the clock track on the servo surface outside of the servo pattern or preferably, the clock track can be written on the vacant disk surface V. The blocks in FIG. 7 outside of the HDA 60 comprise circuit elements of the servo writer processing circuitry 182 housed on the circuit board 183 depicted in FIGS. 5 and 6.

As aforementioned, the servo writer assembly processing circuitry 182 includes an optical encoder (204 in FIG. 7). In a typical embodiment, the optical encoder provides a dual triangular waveform output signal comprise of a reference signal 207R and a quadrature signal 207Q displaced by 90° from the reference signal. The optical encoder output signal is coupled to a detector/counter 206 which detects zero crossings, each indicative of a concentric track to be recorded on the servo surface. The detector/counter 206 additionally maintains a zero crossing or track count as the positioner motor moves the servo head 200 radially over the servo surface.

The processing circuitry 182 is essentially controlled by a microprocessor based controller 208 which is able to interrogate the count of counter 206 and to control the positioner motor 74 via power amplifier 210. The microprocessor based controller 208 additionally controls a clock track generator 211 which, via the read write amplifier 212 and clock track head 202 can record clock bits in a clock track usually located close to the outer edge of the disk servo surface. The controller 208 additionally controls the actuation of a servo pattern generator 214 which records via read write amplifier 216 and servo head 200, an appropriate pattern at each successive concentric servo track. The servo read write amplifier 216 is responsive not only to the servo pattern generator 214 but also to the clock track information read via the amplifier 212 to assure that the inboard and outboard pulses to be recorded alternately relative to each track centerline are in synchronism with the clock bits recorded on the clock track.

Figure 8:
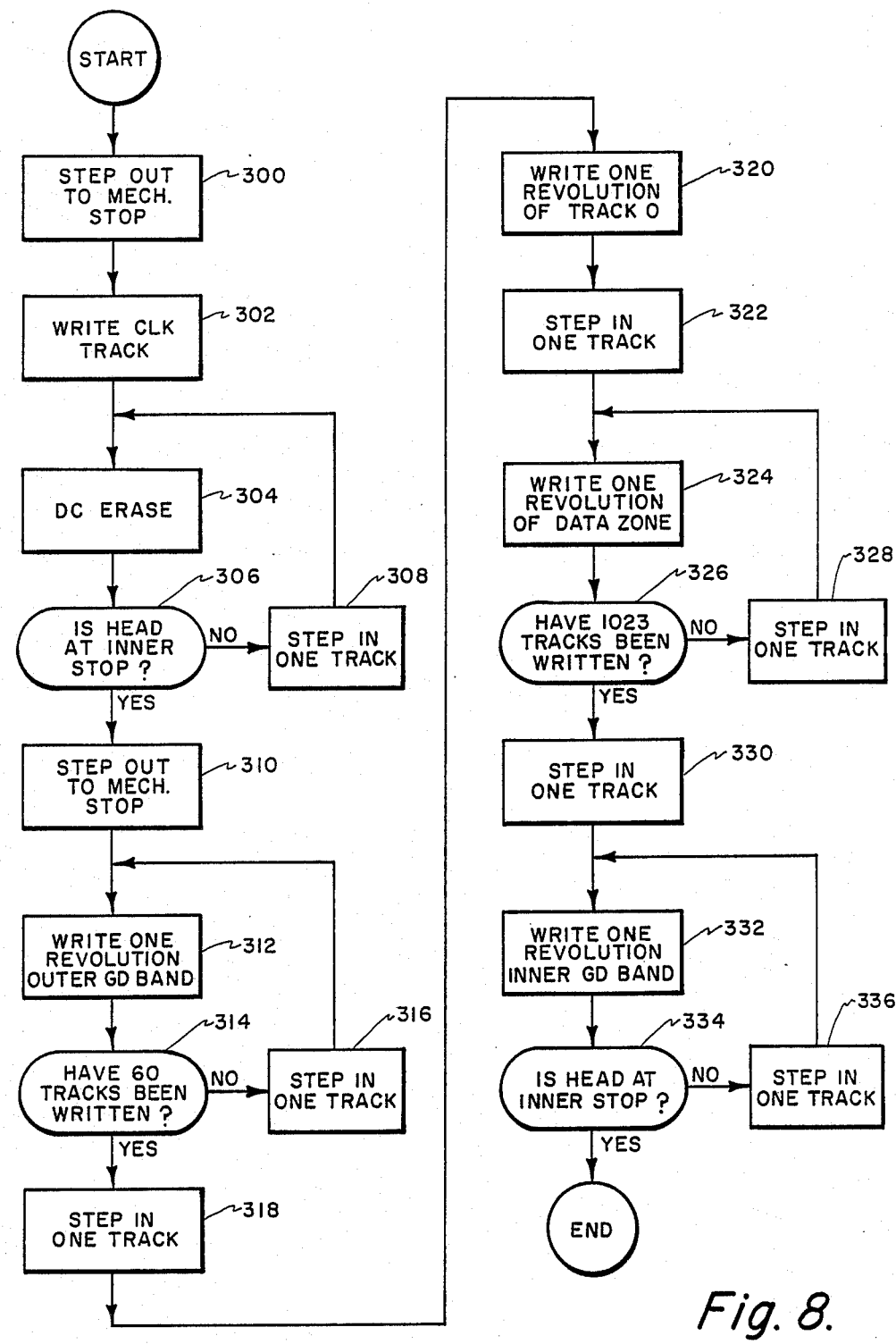
FIG. 8 is a flow chart depicting the operation of the controller electronics of FIG. 7 for the purpose of originally recording servo information tracks.

Attention is now directed to FIG. 8 which comprises a flow chart depicting the operation of the microprocessor based controller 208 of FIG. 7 for the purpose of originally recording concentric tracks of servo information onto the servo surface of the HDA. The programming to execute the flow chart of FIG. 8 is typically recorded in a read only memory (not shown) associated with the microprocessor based controller 208 in a manner well known in the art.

Before describing the flow chart of FIG. 8 in detail, it is pointed out that it depicts the operation of the apparatus of FIG. 7 to record a particular servo information format on the servo surface which has been presumed to include an outer guard band comprised of 60 tracks, a track zero mark comprised of a single track, a data zone comprised of 1023 tracks, and an inner guard band comprised of at least 140 tracks. Although this servo surface format is fairly typical, certainly other disk storage systems employing different formats could be readily accommodated in systems utilizing the present invention. The initial block 300 of FIG. 8 calls for the positioner motor 70 to move the heads outwardly until a mechanical outer stop (not shown) is reached. Thereafter, the clock track generator 211 is energized b the microprocessor controller 208 to write the clock track as represented by the block 302. It will be recalled that the clock head 202 is fixed in a position so as to avoid conflict between the clock track and servo pattern. Preferably the head 202 will be mounted so as to write the clock track on vacant disk surface V. Alternatively, however, the clock track could be written along the outer edge of the servo surface at a radial distance greater than the mechanical outer stop of the servo read write head 200. In any event, the servo head 200 can never read from or write onto the clock track written by clock head 202.

After the clock track is written, the microprocessor proceeds to DC erase the servo surface between the mechanical stops. More specifically, block 304 causes head 200 to erase the track where it positioned. Decision block 306 inquires whether the head 200 is at its inner stop. If not, the positioner motor is stepped inwardly one track (block 308) by a distance equal to the swing of the optical encoder arm 132 from one zero crossing of the optical encoder output signal to the subsequent zero crossing. Thus, the loop comprised of blocks 304, 306, and 308 causes the servo head 200 to step inwardly through the outer guard band, track zero, the data information zone, and the inner guard band, to DC erase the servo surface.

When the inner stop is reached, operation proceeds to block 310 which repositions the servo head back to the outer stop. In block 312 one revolution of the outer guard band servo information is written. Decision block 314 then inquires has sixty tracks of outer guard band information been written yet. If not, operation proceeds to block 316 which, like the aforementioned block 308, steps the head 200 inwardly one track. Thus, the loop defined by blocks 312, 314, and 316 causes the system of FIG. 7 to write sixty tracks of servo guard band information. After the sixty tracks have been written, operation proceeds to block 318 which steps the head 200 in by one track and then to block 320 which causes the unique servo track zero to be written. Block 322 then moves head 200 in one further track and block 324 causes the first servo information zone track to be written. Operation then proceeds to decision block 326 which asks has 1023 data tracks yet been written. If not, operation proceeds to block 328 to step the head 200 inwardly one track at a time. The loop defined by blocks 324, 326, and 328 thus causes 1023 concentric tracks of servo information to be written in the data zone. After this is completed, the head 200 is stepped in one more track (block 330). In block 332 the first track of the inner guard band is written. Operation then proceeds to decision block 334 which inquires whether the inner mechanical stop has been reached. If not, operation proceeds to block 336 which causes the head 200 to move in one track. The loop defined by blocks 332, 334, and 336 thus causes the remaining tracks to be written. After the entire inner guard band has been written, the operation is concluded.

From the foregoing, it should now be appreciated that a method and apparatus has been disclosed herein for inexpensively and accurately originally recording servo information on a surface of a disk drive system. Although it has been assumed herein that all of the servo information is recorded on a single dedicated surface, it is pointed out the servo information can actually be distributed amongst different disk surfaces without departing from the contemplation of the invention.

What is claimed is:

1. Servo information recording apparatus useful with a head disk assembly having (1) a plurality of disk surfaces, each having a head uniquely associated therewith, and (2) a positioner subsystem including a positioner motor for moving said heads to selected radial positions on said surfaces, said apparatus comprising:
   optical encoder means including a movable input member for producing an output signal comprised of signal transitions identifying small units of movement of said input member;
   means physically detachably attaching said movable input member to said positioner motor for moving said input member in a manner directly related to the movement of said heads; and
   controller means responsive to said optical encoder output signal for driving said positioner motor to step said heads to successive radial positions along said disk surfaces, said controller means including servo generator means for recording a servo pattern on one or more of said disk surfaces at each of said radial positions.

2. The apparatus of claim 1 further including a housing having an idler shaft supported therein for rotation about its axis and wherein said movable input member is secured to said idler shaft; and wherein
   said means detachably attaching said input member to said positioner motor includes selectively operable means for securing said housing to said head disk assembly.

3. The apparatus of claim 2 including coupler means for physically coupling said idler shaft to the shaft of said positioner motor when said housing is secured to said head disk assembly.

4. The apparatus of claim 1 wherein said controller means includes microprocessor means operable to successively move said heads to a different radial position and to record a servo pattern at each of said radial positions.

5. The apparatus of claim 4 wherein said positioner motor comprises a rotary motor having a shaft mounted for rotation; and wherein
   said movable input member is mounted for rotation coincident with said positioner motor shaft.

6. The apparatus of claim 5 wherein successive transitions of said output signal define movement of said heads between adjacent radial positions.

7. A servo writer assembly useful for originally recording concentric tracks of servo information on a dedicated surface of a plurality of disks wherein said disks comprise part of a head disk assembly including a rotary positioner motor for moving read/write heads to selected radial positions on said disk surfaces, said servo writer assembly comprising:
   a housing including a shaft mounted for rotation about its axis;
   means for detachably mounting said housing proximate to said head disk assembly with said housing shaft substantially aligned with a shaft of said positioner motor;
   coupling means for physically coupling said housing shaft to said positioner motor shaft;
   an elongated member secured to an end extending radially from said housing shaft;
   an optical scale comprised of alternating transparent and opaque areas mounted on the free end of said scale;
   encoder means mounted proximate to said optical scale for producing an output signal comprised of signal transitions each corresponding to a small unit of angular movement of said optical scale;
   controller means responsive to said optical encoder output signal for driving said positioner motor to step said heads to successive radial positions along said disk surfaces, said controller means including servo generator means for recording a servo pattern on one or more of said disk surfaces at each of said radial positions.

8. The servo writer assembly of claim 7 wherein said housing includes registration holes; and wherein
   said means for detachably mounting said housing includes alignment bolts extending through said registration holes for threaded engagement in said positioner motor.

9. The servo writer assembly of claim 8 wherein said coupling means includes set screw means coupling said housing shaft to said positioner motor shaft when said alignment bolts are threadedly engaged in said positioner motor.

10. The servo writer assembly of claim 9 wherein said coupling means includes flexible means for accommodating slight misalignment between said housing shaft and positioner motor shaft.

11. A method for originally recording tracks of servo information on one or more surfaces of a head disk assembly comprised of a plurality of disks and a plurality of heads, each head uniquely associated with a different disk surface, and wherein said assembly includes a positioner motor for moving said heads to selected positions on said disk surfaces, said method including the steps of:

detachably attaching a servo writer shaft to the shaft of said positioner motor so that said servo writer shaft extends outwardly from said head disk assembly;

producing an output signal comprised of signal transitions wherein successive transitions define a small unit of angular rotation of said servo writer shaft;

responding to said output signal for driving said positioner motor to step said heads to successive radial positions along said disk surfaces; and recording a servo information track on one or more of said surfaces at each of said radial positions.

* * * * *